US008530394B2

(12) United States Patent  (10) Patent No.: US 8,530,394 B2
Gatlin                     (45) Date of Patent:    Sep. 10, 2013

(54) STERICALLY HINDERED N-METHYL SECONDARY AND TERTIARY AMINE SULFUR SCAVENGERS AND METHODS FOR MAKING AND USING SAME

(75) Inventor: Larry W. Gatlin, San Antonio, TX (US)

(73) Assignee: Clearwater International LLC, Houston, TX (US)

( * ) Notice: Subject to any disclaimer, the term of this patent is extended or adjusted under 35 U.S.C. 154(b) by 66 days.

(21) Appl. No.: 12/419,418

(22) Filed: Apr. 7, 2009

(65) Prior Publication Data
US 2009/0250659 A1 Oct. 8, 2009

Related U.S. Application Data

(62) Division of application No. 10/754,487, filed on Jan. 9, 2004, now Pat. No. 7,517,447.

(51) Int. Cl.
C09K 8/532 (2006.01)
C07C 209/00 (2006.01)

(52) U.S. Cl.
USPC .......................... 507/239; 564/471

(58) Field of Classification Search
USPC .......................... 507/239; 564/471
See application file for complete search history.

(56) References Cited

U.S. PATENT DOCUMENTS

| | | | |
|---|---|---|---|
| 4,052,159 A | 10/1977 | Fuerst et al. | |
| 4,395,311 A * | 7/1983 | McDonald | 564/503 |
| 5,030,762 A * | 7/1991 | Brake | 564/508 |
| 5,074,991 A | 12/1991 | Weers | 208/236 |
| 5,169,411 A | 12/1992 | Weers | |
| 5,190,640 A * | 3/1993 | Roof et al. | 208/236 |
| 5,347,004 A | 9/1994 | Rivers et al. | |
| 5,462,721 A | 10/1995 | Pounds et al. | |
| 5,488,103 A | 1/1996 | Gatlin | |
| 5,674,377 A | 10/1997 | Sullivan, III et al. | |
| 5,688,478 A | 11/1997 | Pounds et al. | |
| 5,744,024 A | 4/1998 | Sullivan, III et al. | |
| 5,980,845 A | 11/1999 | Cherry | |
| 6,054,417 A | 4/2000 | Graham et al. | |
| 6,267,938 B1 | 7/2001 | Warrender et al. | |
| 7,140,433 B2 | 11/2006 | Gatlin et al. | 166/250.01 |
| 2002/0049256 A1 | 4/2002 | Bergeron, Jr. | |
| 2005/0130847 A1 | 6/2005 | Gatlin et al. | |
| 2005/0137114 A1 | 6/2005 | Gatlin et al. | |
| 2005/0250666 A1 | 11/2005 | Gatlin et al. | |
| 2006/0116296 A1 | 8/2006 | Kippie et al. | |
| 2006/0194700 A1 | 8/2006 | Gatlin et al. | |

FOREIGN PATENT DOCUMENTS

| | | |
|---|---|---|
| CA | 2125513 | 1/1995 |
| CA | 2007965 | 2/1996 |
| DE | 4027300 | 5/1992 |
| EP | 475641 A1 | 3/1992 |
| EP | 882778 A2 | 12/1998 |
| GB | 775376 | 10/1954 |
| JP | 10001461 | 6/1988 |
| JP | 08151422 | 11/1996 |
| WO | WO 98/19774 | 5/1998 |

OTHER PUBLICATIONS

U.S. Appl. No. 11/328,432, filed Jan. 9, 2006, Wilson.
U.S. Appl. No. 11/293,859, filed Dec. 2, 2005, Kippie et al.
U.S. Appl. No. 11/298,547, filed Dec. 9, 2005, Gatlin et al.
U.S. Appl. No. 11/298,556, filed Dec. 9, 2005, Gatlin et al.
U.S. Appl. No. 11/339,303, filed Jan. 25, 2006, Lukos et al.
U.S. Appl. No. 11/545,387, filed Oct. 10, 2006, Gatlin et al.
U.S. Appl. No. 11/554,834, filed Oct. 31, 2006, Venditto et al.
Sartori, F. and Savage, D.W., Sterically Hindered Amines for CO2 Removal from Gases, Ind. Eng. Chem. Fundam. 1983, 22, 239-249.
Fushslueger, U., Socher, G., Grether, H.-J., Grasserbauer, M., Capillary Supercritical Fluid Chromatography/Mass Spectroscopy of Phenolic Mannich Bases with Dimethyl Ether Modified Ethane as Mobile Phase, Anal. Chem., 1999, 71, 2324-2333.
Kauffman, W.J., Observations on the Synthesis and Characterization of N,N',N"-Tris-(dimethylaminopropyly)hexahydro-s-triazine and isolable intermediates, XP009005168.
Delepine, M., Effect of Hydrogen Sulfide on Trimethyltrimethyl Triamine, Bull. Soc. Chit, 1896, 14, 889-891. (English Translation).
Delepine, M., Effect of Hydrogen Sulfide and Trimethyltrimethyl Triamine, Ann. Chim. Phys., 1896, 4, 114-133 (English Translation).
Paquin, A.M., Reaction of Primary Amines with Aliphatic Aldehydes, Chem. Ber., 1949, 82, 316-326 (English Translation).
Castillo, M., Avila, Y.S., Rodrigues, R.E., Viloria, A., H2S Liquid e Scavengers, Their Corrosivity Properites and the Compatibility with Other Down Stream Processes, Corrosion 2000, paper 00491.

* cited by examiner

Primary Examiner — Randy Boyer
(74) Attorney, Agent, or Firm — Robert W Strozier

(57) ABSTRACT

An new class of oil-soluble, sulfur scavengers or converts are disclosed where the scavengers include substantially monomeric aldehyde-amine adducts from the reaction of at least one sterically hindered primary or secondary amine and a molar excess of at least one aldehyde. Methods are also disclosed for reducing, reducing below a given level or eliminating noxious sulfur species from fluids using the inventive scavengers and for making the inventive scavengers.

22 Claims, 9 Drawing Sheets

STERICALLY HINDERED N-METHYL SECONDARY AND TERTIARY AMINE SULFUR SCAVENGERS AND METHODS FOR MAKING AND USING SAME

RELATED APPLICATIONS

This application is divisional application of, claims priority to and the benefit of U.S. patent application Ser. No. 10/754,487, filed 9 Jan. 2004 (Jan. 9, 2004), now U.S. Pat. No. 7,517,447, issued 14 Apr. 2009 (Apr. 14, 2009).

BACKGROUND OF THE INVENTION

1. Field of the Invention

The present invention relates to a new class of oil-soluble sulfur scavengers including N-alkyl hindered secondary or tertiary amines.

More particularly, the present invention relates a new class of oil-soluble sulfur scavengers including N-alkyl hindered secondary or tertiary amines and to a method for making the scavengers including contacting a sterically hindered primary or secondary amines with an aldehyde under conditions designed to promote alkylation of the amine.

2. Description of the Related Art

Many patents relate to sulfur scavengers for sweetening gas and liquid hydrocarbon streams such as U.S. Pat. Nos. 4,748,011; 4,978,512; 2,390,153; 3,856,921; 4,112,050; 4,112,051; 4,112,052; and Sartori and Savage "Sterically Hindered Amines for $CO_2$ Removal from Gases" in I & EC FUNDAMENTALS, Vol. 2, No. 22 (1983).

Where sterically hindered amines such as aliphatic diamines and amino alcohols have previously been used in gas sweetening to form carbonates or bicarbonates from carbon dioxide, or to form sulfides or bisulfides from hydrogen sulfide reactions, such processes have typically involved a regeneration step to recover the carbon dioxide or hydrogen sulfide. During the regeneration step, the carbon dioxide or hydrogen sulfide is liberated from the process fluid. A process and composition are therefore needed that will convert hydrogen sulfide to a stable, nontoxic and noncorrosive form without a corresponding need for regeneration of process fluids.

Although many sulfur scavengers have been used and patented, there is still a need for new classes of sulfur scavengers, especially, sulfur scavengers that are effective in a triphasic environment (two liquid phases and a gas phase.

SUMMARY OF THE INVENTION

Compositions and Methods of Use of Sulfur Scavengers of this Invention

The present invention provides an oil-soluble sulfur scavenging or converting composition including a reaction product of a sterically hindered primary or secondary amine and a molar excess of an aldehyde, under conditions to produce substantially a monomeric product.

The present invention provides a method including the step of contacting a fluid with an effective amount of composition an oil-soluble sulfur scavenging or converting composition including a reaction product of a sterically hindered primary or secondary amine and a molar excess of an aldehyde, under conditions to produce substantially a monomeric product.
Compositions and Methods of Use of Sulfur Scavengers of Formulas (I) and (II)

The present invention provides an oil-soluble sulfur scavenging or converting composition including at least one amine characterized by the general formulas (I), (II) or mixtures of amines of formulas (I) and (II):

where R is a hydrogen atom (H) or a carbon-containing group, $R^1$ and $R^2$ are the same or different, at least one being a sterically hindered carbon-containing group having between about 6 and about 24 carbon atoms or $R^1$ and $R^2$ can form a ring system, $R^3$ is a divalent sterically hindered carbon-containing group, $R^4$ and $R^5$ are the same or different and are H or a $CH_2R$ group and where one or more of the carbon atoms of R, $R^1$, $R^2$, $R^3$, $R^4$, $R^5$ or mixtures thereof can be replaced by oxygen atoms in the form of ether moieties, nitrogen groups in the form of tertiary amine or amide moieties or mixtures thereof, and where one or more hydrogen atoms of R, $R^1$, $R^2$, $R^3$, $R^4$, $R^5$ or mixtures thereof can be replaced by fluorine atoms, chlorine atoms or mixtures thereof. The compositions of the present invention are generally used as a solution in an appropriate solvent, preferably an organic solvent and particularly an aprotic organic solvent.

The present invention also provides an oil-soluble sulfur scavenging composition including at least one amine of formulas (I), (II) or mixtures thereof. The compositions of the present invention are generally used as a solution in an appropriate solvent, preferably an organic solvent and particularly an aprotic organic solvent.

The present invention provides a method including the step of contacting a fluid with an effective amount of an oil-soluble, sulfur scavenging composition including at least one amine characterized by the general formulas (I), (II) or mixtures of amines of formulas (I) and (II):

where R is a hydrogen atom (H) or a carbon-containing group, $R^1$ and $R^2$ are the same or different, at least one being a sterically hindered carbon-containing group having between about 6 and about 24 carbon atoms or $R^1$ and $R^2$ can form a ring system, $R^3$ is a divalent sterically hindered carbon-containing group, $R^4$ and $R^5$ are the same or different and are H or a $CH_2R$ group and where one or more of the carbon atoms of R, $R^1$, $R^2$, $R^3$, $R^4$, $R^5$ or mixtures thereof can be replaced by oxygen atoms in the form of ether moieties, nitrogen groups in the form of tertiary amine or amide moieties or mixtures thereof, and where one or more hydrogen atoms of R, $R^1$, $R^2$, $R^3$, $R^4$, $R^5$ or mixtures thereof can be replaced by fluorine atoms, chlorine atoms or mixtures thereof, and where the amount is sufficient to reduce, reduce below a given value, reduce below detection limits or substantially eliminate noxious sulfur species from the fluid and where the fluid includes an organic phase, where the substantially eliminate means that the concentration of noxious sulfur-containing species are reduced below the current EPA or other governmental level. The compositions of the present invention are generally used as a solution in an appropriate solvent, preferably an organic soluble solvent and particularly an aprotic organic soluble solvent.

The present invention provides a method including the step of contacting a fluid with an effective amount of composition comprising at least one compound of formulas (I), (II) or mixtures thereof, where the amount is sufficient to reduce, reduce below a given value, reduce below detection limits or substantially eliminate noxious sulfur species from the fluid and where the fluid includes an organic phase. The compositions of the present invention are generally used as a solution in an appropriate solvent, preferably an organic solvent and particularly an aprotic organic solvent.

Compositions and Methods of Use of Sulfur Scavengers of Formulas (IA) and (IIA)

The present invention also provides an oil-soluble sulfur scavenging composition including a sulfur scavenger characterized by the formulas (IA), (IIA) or mixtures of amines of formulas (IA) and (IIA):

$$CH_2R\text{—}NR^{1'}R^{2'} \quad (IA)$$

$$CH_2R\text{—}R^{4'}NR^3NR^{5'}\text{—}CH_2R \quad (IIA)$$

where R is H or a carbon-containing group, $R^{1'}$ and $R^{2'}$ are the same or different sterically hindered carbon-containing groups having between about 3 and about 24 carbon atoms or $R^1$ and $R^2$ can form a ring system, $R^3$ is a previously defined, $R^{4'}$ and $R^{5'}$ are $CH_2R$, and where one or more of the carbon atoms of R, $R^{1'}$, $R^{2'}$, $R^3$, $R^{4'}$, $R^{5'}$ or mixtures thereof can be replaced by oxygen atoms in the form of ether moieties, nitrogen groups in the form of tertiary amine or amide moieties or mixtures thereof, and where one or more hydrogen atoms of R, $R^{1'}$, $R^{2'}$, $R^3$, $R^{4'}$, $R^{5'}$ or mixtures thereof can be replaced by fluorine atoms, chlorine atoms or mixtures thereof. The compositions of the present invention are generally used as a solution in an appropriate solvent, preferably an organic solvent and particularly an aprotic organic solvent.

The present invention also provides an oil-soluble sulfur scavenging composition including at least one amine of formulas (IA), (IIA) or mixtures thereof. The compositions of the present invention are generally used as a solution in an appropriate solvent, preferably an organic solvent and particularly an aprotic organic solvent.

The present invention provides a method including the step of contacting a fluid with an effective amount of an oil-soluble sulfur scavenging composition including a sulfur scavenger characterized by the formulas (IA), (IIA) or mixtures of amines of formulas (IA) and (IIA):

$$CH_2R\text{—}NR^{1'}R^{2'} \quad (IA)$$

$$CH_2R\text{—}R^{4'}NR^3NR^{5'}\text{—}CH_2R \quad (IIA)$$

where R is H or a carbon-containing group, $R^{1'}$ and $R^{2'}$ are the same or different sterically hindered carbon-containing groups having between about 3 and about 24 carbon atoms or $R^1$ and $R^2$ can form a ring system, $R^3$ is a previously defined, $R^{4'}$ and $R^{5'}$ are $CH_2R$ and where one or more of the carbon atoms of R, $R^{1'}$, $R^{2'}$, $R^3$, $R^{4'}$, $R^{5'}$ or mixtures thereof can be replaced by oxygen atoms in the form of ether moieties, nitrogen groups in the form of tertiary amine or amide moieties or mixtures thereof, and where one or more hydrogen atoms of R, $R^{1'}$, $R^{2'}$, $R^3$, $R^{4'}$, $R^{5'}$ or mixtures thereof can be replaced by fluorine atoms, chlorine atoms or mixtures thereof, and where the amount is sufficient to reduce, reduce below a given value, reduce below detection limits or substantially eliminate noxious sulfur species from the fluid and where the fluid includes an organic phase. The compositions of the present invention are generally used as a solution in an appropriate solvent, preferably an organic solvent and particularly an aprotic organic solvent.

The present invention provides a method including the step of contacting a fluid with an effective amount of composition comprising at least one compound of formulas (IA), (IIA) or mixtures thereof, where the amount is sufficient to reduce, reduce below a given value, reduce below detection limits or substantially eliminate noxious sulfur species from the fluid and where the fluid includes an organic phase. The compositions of the present invention are generally used as a solution in an appropriate solvent, preferably an organic solvent and particularly an aprotic organic solvent.

Compositions and Methods of Use of Sulfur Scavengers for Formulas (IB) and (IIB)

The present invention also provides an oil-soluble sulfur scavenging composition including a sulfur scavenger characterized by the formulas (IB), (IIB) or mixtures thereof:

$$CH_2R\text{—}NR^{1''}R^{2''} \quad (IB)$$

$$CH_2R\text{—}R^{4''}NR^3NR^{5''}\text{—}CH_2R \quad (IIB)$$

where R is H or a carbon-containing group, $R^{1''}$ is a sterically hindered carbon-containing group having between about 3 and about 24 carbon atoms, $R^{2''}$ is H or a $CH_2R$ group, $R^3$ is as previously defined, $R^{4''}$ and $R^{5''}$ are H and where one or more of the carbon atoms of R, $R^{1''}$, $R^{2''}$, $R^3$ or mixtures thereof can be replaced by oxygen atoms in the form of ether moieties, nitrogen groups in the form of tertiary amine or amide moieties or mixtures thereof, and where one or more hydrogen atoms of R, $R^{1''}$, $R^{2''}$, $R^3$ or mixtures thereof can be replaced by fluorine atoms, chlorine atoms or mixtures thereof. The compositions of the present invention are generally used as a solution in an appropriate solvent, preferably an organic solvent and particularly an aprotic organic solvent.

The present invention also provides an oil-soluble sulfur scavenging composition including at least one amine of formulas (IB), (IIB) or mixtures thereof. The compositions of the present invention are generally used as a solution in an appropriate solvent, preferably an organic solvent and particularly an aprotic organic solvent.

The present invention provides a method including the step of contacting a fluid with an effective amount of an oil-soluble sulfur scavenging composition including a sulfur scavenger characterized by the formula (IB), (IIB) or mixtures thereof:

$$CH_2R\text{—}NR^{1''}R^{2''} \quad (IB)$$

$$CH_2R\text{—}R^{4}NR^3NR^{5}\text{—}CH_2R \quad (II)$$

where R is H or a carbon-containing group, $R^{1''}$ is a sterically hindered carbon-containing group having between about 3 and about 24 carbon atoms, $R^{2''}$ is H or a $CH_2R$ group, $R^3$ is as previously defined, $R^{4''}$ and $R^{5''}$ are H and where one or more of the carbon atoms of R, $R^{1''}$, $R^{2''}$, $R^3$ or mixtures thereof can be replaced by oxygen atoms in the form of ether moieties, nitrogen groups in the form of tertiary amine or amide moieties or mixtures thereof, and where one or more hydrogen atoms of R, $R^{1''}$, $R^{2''}$, $R^3$ or mixtures thereof can be replaced by fluorine atoms, chlorine atoms or mixtures thereof, and where the amount is sufficient to reduce, reduce below a given value, reduce below detection limits or substantially eliminate noxious sulfur species from the fluid and where the fluid includes an organic phase. The compositions of the present invention are generally used as a solution in an appropriate solvent, preferably an organic solvent and particularly an aprotic organic solvent.

The present invention provides a method including the step of contacting a fluid with an effective amount of composition comprising at least one compound of formulas (IB), (IIB) or mixtures thereof, where the amount is sufficient to reduce, reduce below a given value, reduce below detection limits or substantially eliminate noxious sulfur species from the fluid and where the fluid includes an organic phase. The compositions of the present invention are generally used as a solution in an appropriate solvent, preferably an organic solvent and particularly an aprotic organic solvent.

General Method of Use

The present invention provides a method for reducing noxious sulfur species from fluids (gases, liquid phases, or mixtures of gases and liquid phases) including the step of contacting a fluid with an effective amount of an oil-soluble, sulfur scavenging composition including at least one sulfur scavenger of formulas (I), (IA), (IB), (II), (IIA), (IIB) or mixtures thereof, where the fluid includes an organic phase. The compositions of the present invention are generally used as a solution in an appropriate solvent, preferably an organic solvent and particularly an aprotic organic solvent.

Methods for Making the Sulfur Scavengers of Formulas (I), (IA), (IB), (II), (IIA), and (IIB)

The present invention provides a method for making an oil-soluble sulfur scavenging of this invention including the steps of contacting at least one hindered primary or secondary amine with a aldehyde, where a mole ratio of aldehyde to amine is at least about 1.5 to 1, preferably, at least about 1.75 to 1, particularly, at least about 2 to 1, and more particularly greater than 2 to 1 at a temperature between about 140° F. to about 200° F. in the presence or absence of an appropriate solvent and for a time sufficient to convert a major portion to substantially all of the amine(s) to a compound of formula (I). After initial reaction, the reaction is continued into a digestion period where substantially all unreacted aldehyde is converted to innocuous aldol condensates such as glycosides or sugars. After the digestion period, the reaction may be distilled, but can be used as is, to form a substantially pure form of a compound of formula (I) or decanted to recover the upper oil soluble layer from the aqueous bottom layer, where the top layer can be used as is.

DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
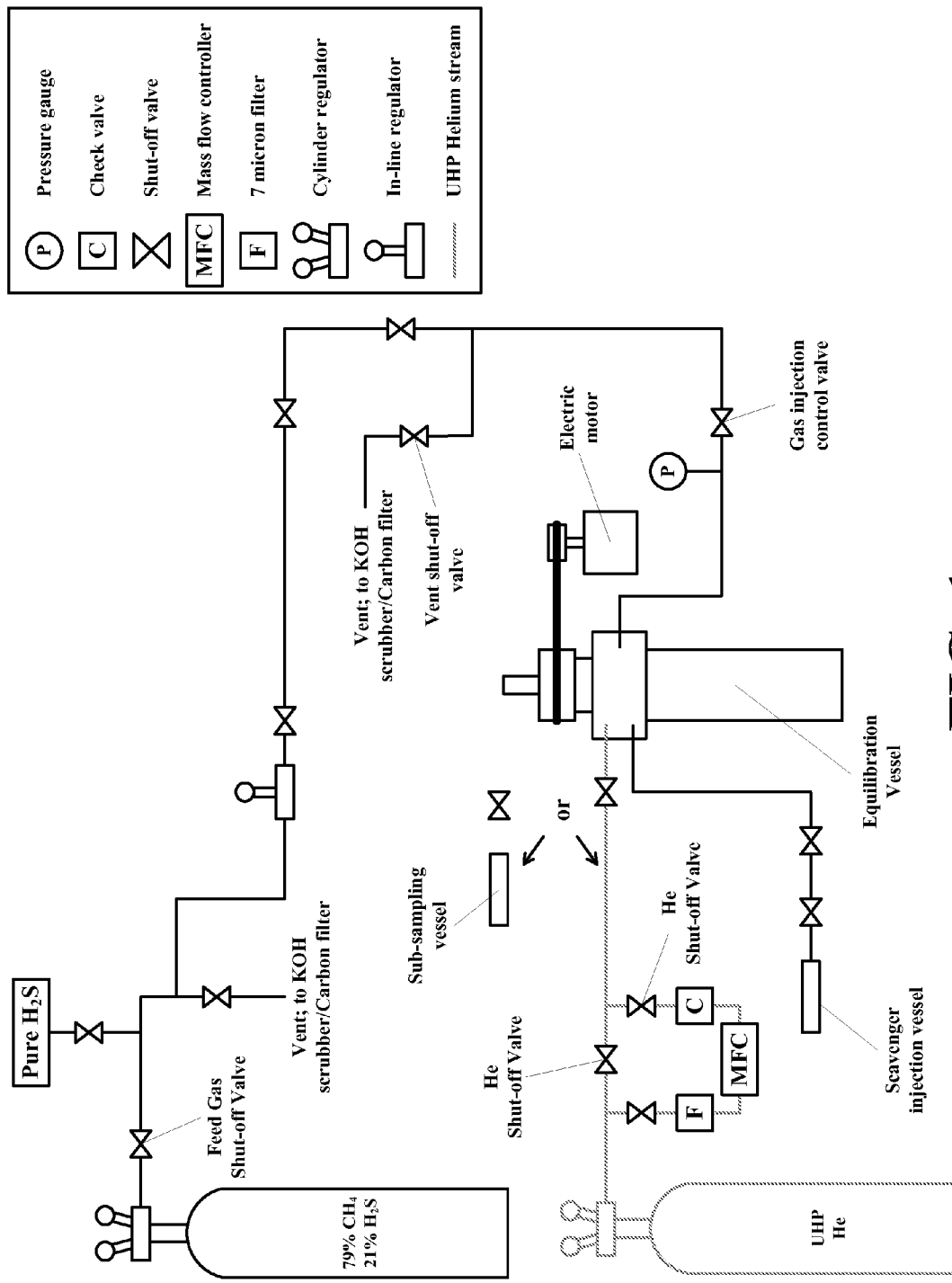
FIG. 1 depicts a schematic drawing of the testing apparatus used to evaluate the scavengers of this invention.
Figure 2:
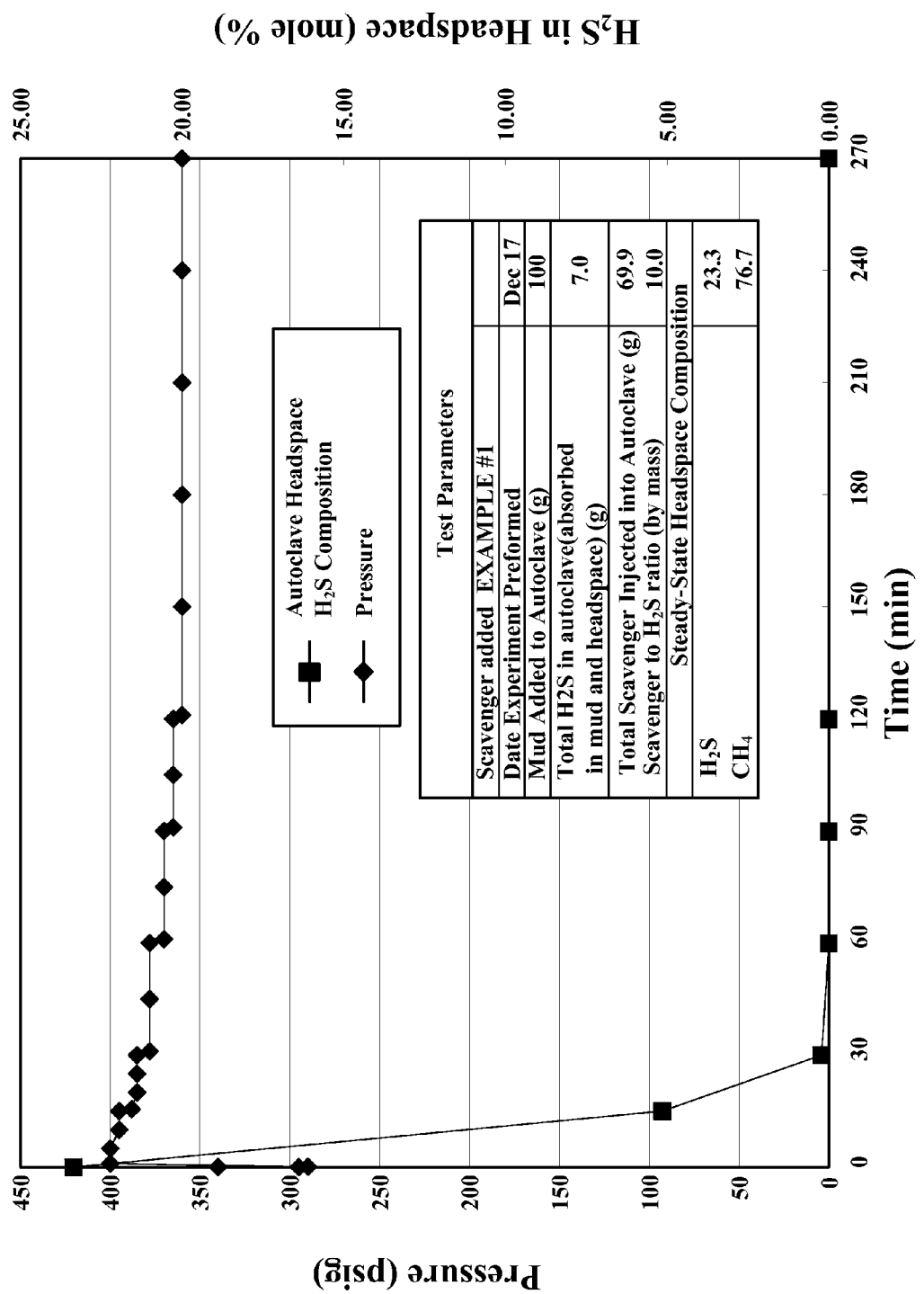
FIG. 2 depicts a plot of pressure and $H_2S$ concentration verses time for a scavenger of this invention tested at high pressure in a sour gas-drilling mud system pressure and headspace $H_2S$ composition profiles at about a 10:1 scavenger to $H_2S$ ratio.
Figure 3:
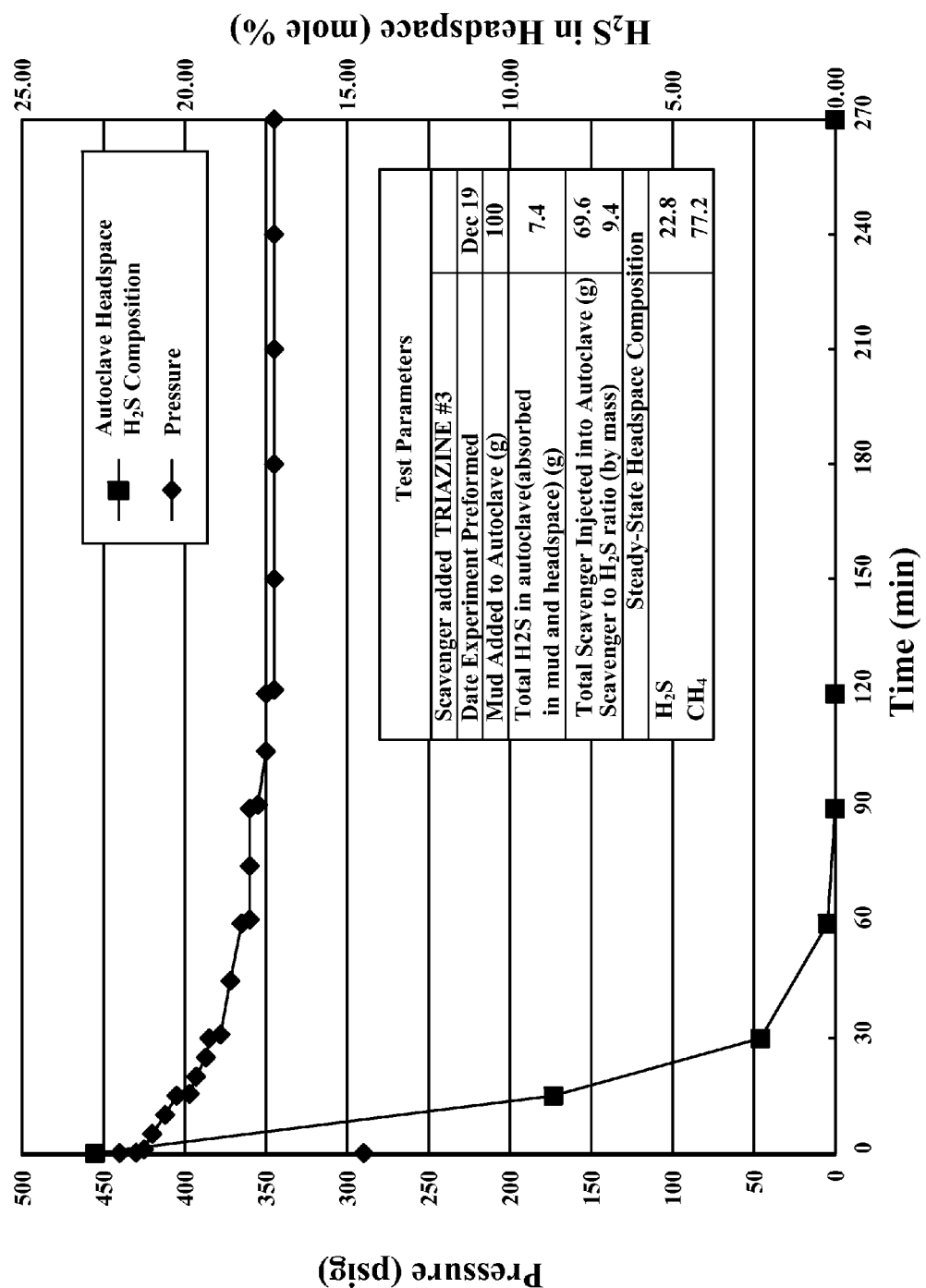
FIG. 3 depicts a plot of pressure and $H_2S$ concentration verses time for a comparative Triazine 3 scavenger tested at high pressure in a sour gas-drilling mud system pressure and headspace $H_2S$ composition profiles at about a 10:1 scavenger to $H_2S$ ratio.
Figure 4:
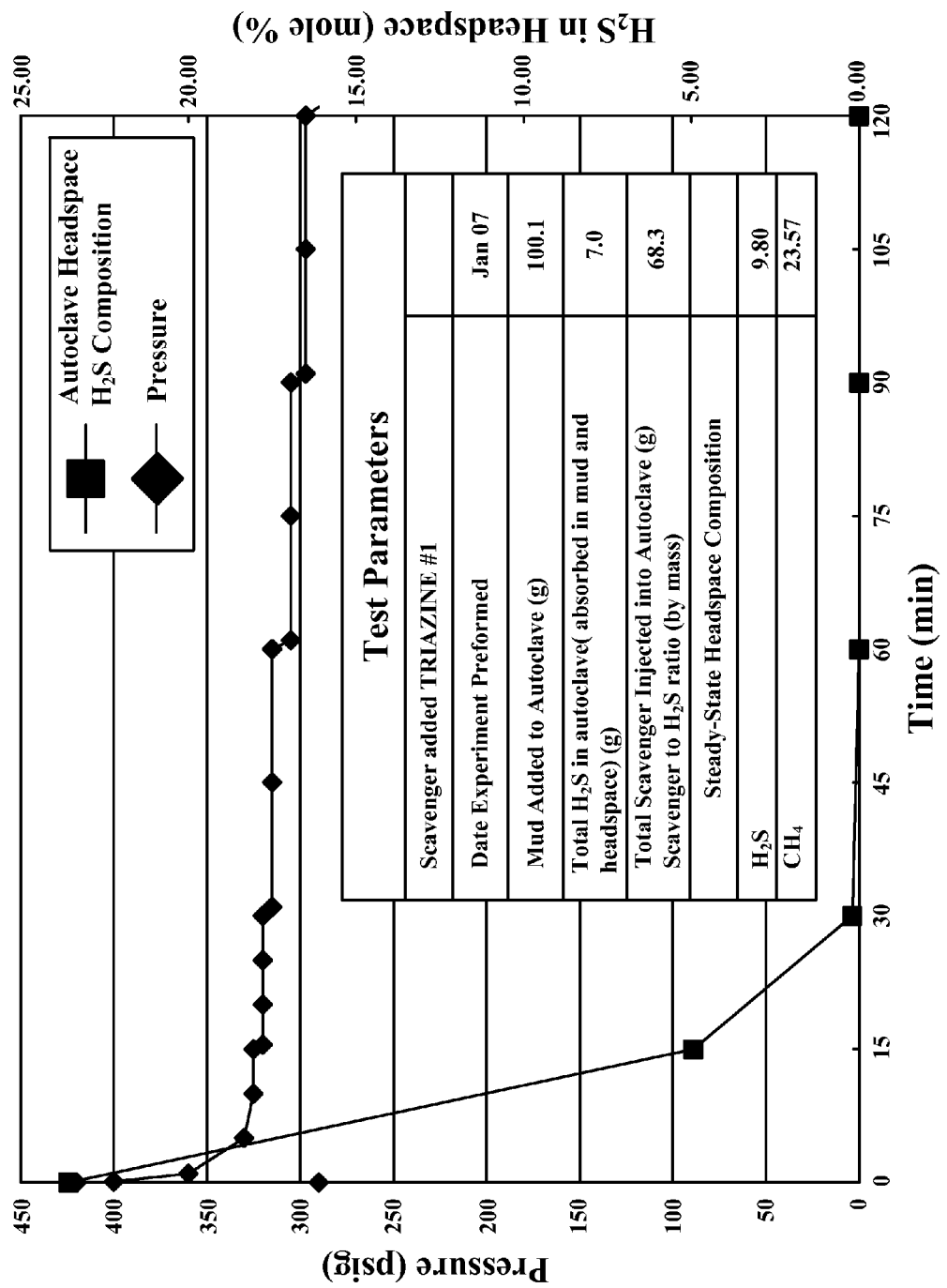
FIG. 4 depicts a plot of pressure and $H_2S$ concentration verses time for a comparative Triazine 1 scavenger tested at high pressure in a sour gas-drilling mud system pressure and headspace $H_2S$ composition profiles at about a 10:1 scavenger to $H_2S$ ratio.
Figure 5:
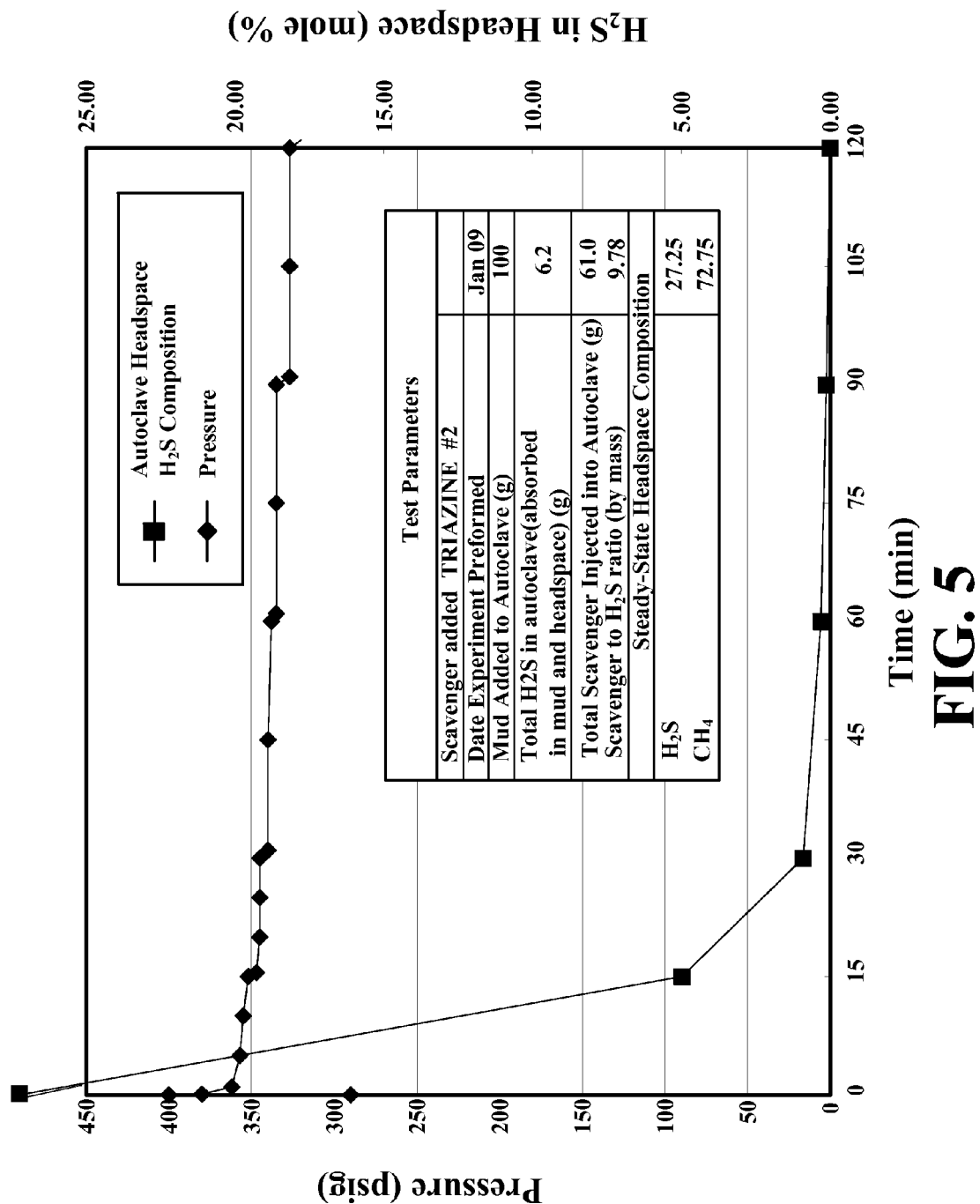
FIG. 5 depicts a plot of pressure and $H_2S$ concentration verses time for a comparative Triazine 2 scavenger tested at high pressure in a sour gas-drilling mud system pressure and headspace $H_2S$ composition profiles at about a 10:1 scavenger to $H_2S$ ratio.

The inventor has found that a new class of sulfur scavenging compositions including a reaction product of a sterically hindered primary or secondary amine and a molar excess of an aldehyde, under conditions to produce substantially a monomeric product and methods for making a using same. The compositions of the present invention are generally used as a solution in an appropriate solvent, preferably an organic solvent and particularly an aprotic organic solvent.

These compositions are well suited for reducing, reducing below a given level or eliminating noxious sulfur compounds such as hydrogen sulfide ($H_2S$), thiol ($R^aSH$), or other odorous and/or corrosive sulfur-containing compounds for fluids including an organic phase, but generally including an aqueous phase, an organic phase and a gas phase—so called triphasic fluids. The inventors have found that the compositions can be effectively, efficiently (near quantitative), and inexpensively prepared by reacting a sterically hindered primary or secondary amine with an aldehyde, where the aldehyde is present in at least a 1.5 molar excess relative to the molar amount of amine added to the reaction mixture and the reaction is maintained at a temperature adjusted to maximize formation of monomeric amine-aldehyde compounds.

The compositions of this invention are ideally suited for reducing, reducing below a target level or substantially eliminating noxious sulfur-containing species in inverted mud or drilling fluids (i.e., an inverted emulsion of an aqueous phase in an organic or oil phase), where the organic or oil phase can include oil-based mud system, produced oil or hydrocarbons, crude or refined by adding on a single, continuous, intermittent or periodic basis an effective amount of a composition of this invention to the inverted drilling systems to achieve the desired reduction. The inverted drilling fluids can be used in overbalanced inverted drilling fluids, weighted inverted drilling fluids, or underbalanced inverted drilling fluids such as foamed drilling fluids or nitrified or lightened drilling fluids utilizing membrane nitrogen.

The compositions of this invention are also ideally suited for reducing, reducing below a target level or substantially eliminating noxious sulfur-containing species in processed fluids from refinery or gas production, including in process stocks and final sale products, such as gasoline, kerosene, jet fuels, diesels, stabilized condensates, LPG, or the like, by adding on a single, continuous, intermittent or periodic basis an effective amount of a composition of this invention to the fluids to achieve the desired reduction.

The compositions of this invention are also ideally suited for reducing, reducing below a target level or substantially eliminating noxious sulfur-containing species in crude oil or condensate (distillate) from oil/gas production, wet (containing water) or dry or mixed streams, by adding on a single, continuous, intermittent or periodic basis an effective amount of a composition of this invention to the crude oil or condensate to achieve the desired reduction.

The compositions of this invention are also ideally suited for reducing, reducing below a target level or substantially eliminating noxious sulfur-containing species in heavy oil fractions from recovery of bitumens, processed mined oils and extracts, bunker C and heavy fuels, by adding on a single, continuous, intermittent or periodic basis an effective amount of a composition of this invention to the materials to achieve the desired reduction.

The compositions of this invention are ideally suited for reducing, reducing below a target level or substantially eliminating noxious sulfur-containing species in lubricating oil, by adding on a single, continuous, intermittent or periodic basis an effective amount of a composition of this invention to the oils to achieve the desired reduction.

The compositions of this invention are ideally suited for use reducing, reducing below a target level or substantially eliminating noxious sulfur-containing species in oil completion fluids such as packer fluids, by adding on a single, continuous, intermittent or periodic basis an effective amount of a composition of this invention to the fluids to achieve the desired reduction.

The compositions of this invention are ideally suited for reducing, reducing below a target level or substantially eliminating noxious sulfur-containing species in storage fluids, pickling fluids with oils, by adding on a single, continuous, intermittent or periodic basis an effective amount of a composition of this invention to the fluids to achieve the desired reduction.

The compositions of this invention are ideally suited for reducing, reducing below a target level or substantially eliminating noxious sulfur-containing species in fluids held, stored and/or transported in tanks, tankers, pipelines, barges, floating platforms, ships, or the like, by adding on a single, continuous, intermittent or periodic basis an effective amount of a composition of this invention to the fluids to achieve the desired reduction.

In downhole applications, the compositions of this invention can be introduced into the downhole fluids through chemical tools, coiled tubing, or capillary coiled tubing (CCT), via squeeze, batch introduction.

The term squeeze as used in downhole operations means pumping a desired volume of a material downhole including an effective amount of the composition of this invention, generally in the form of a solution, into coiled tubing or capillary coiled tubing previously inserted into a well to a given or desire depth and then pushing or displacing the desired amount of the material including the composition of this invention into the well at the given depth with a sufficient amount of a displacing fluid, which can be a liquid (aqueous or non-aqueous) and/or gas, where the gas is preferably nitrogen and the liquid is preferably water or an oil and where the effective amount is sufficient to reduce, reduce below a given level, reduce below a detection limit or substantially eliminate noxious sulfur-containing species. The amount of material to be pumped or injected into the well is typically specified as a volume and is calculated to put sufficient material downhole to fill all space and the sufficient amount of displacing fluid is determined to be sufficient push the material into the space, where the sufficient amount is preferably greater than the amount needed to displace all of the material in the tubing to ensure complete injection of the material downhole. The amount of material and the amount of displacing fluid are generally variable and are calculated based formation properties. Typically, the amounts are about 200 barrels or more. After the material and displacing fluid has been injected into the well, the well is shut-in for a given period of time sufficient for the material to percolate into the formation. Generally, the material is designed to increase well productivity and in this case also includes the sulfur scavengers of this invention sufficient to reduce the noxious sulfur-containing species in the formation prior to production. For further details on squeezing, the reader is referred to U.S. Pat. Nos. 6,581,687; 6,173,780; and 6,089,318; incorporated herein by reference.

The present invention broadly relates to an oil-soluble sulfur scavenging composition including a reaction product of a sterically hindered primary or secondary amine and a molar excess of an aldehyde, under conditions to produce substantially a monomeric product. Some of these monomeric reaction products are characterized by compounds of the general formulas (I), (II) or mixtures thereof:

$$CH_2R-NR^1R^2 \qquad (I)$$

$$CH_2R-R^4NR^3NR^5-CH_2R \qquad (II)$$

where R is a hydrogen atom (H) or a carbon-containing group, $R^1$ and $R^2$ are the same or different, at least one being a sterically hindered carbon-containing group having between about 6 and about 24 carbon atoms or $R^1$ and $R^2$ can form a ring system, $R^3$ is a divalent sterically hindered carbon-containing group, $R^4$ and $R^5$ are the same or different and are H or a $CH_2R$ group and where one or more of the carbon atoms of R, $R^1$, $R^2$, $R^3$, $R^4$, $R^5$ or mixtures thereof can be replaced by oxygen atoms in the form of ether moieties, nitrogen groups in the form of tertiary amine or amide moieties or mixtures thereof, and where one or more hydrogen atoms of R, $R^1$, $R^2$, $R^3$, $R^4$, $R^5$ or mixtures thereof can be replaced by fluorine atoms, chlorine atoms or mixtures thereof.

Generally, the compositions of this invention are used as a solution in an appropriate solvent, preferably an organic solvent and especially, an aprotic organic solvent. The solution generally includes between about 5 wt. % and about 50 wt. % of the at least one compound of formulas (I), (II) or mixtures thereof, preferably, between about 5 wt. % and about 40 wt. % of the at least one compound of formulas (I), (II) or mixtures thereof, particularly, between about 7.5 wt. % to about 30 wt. % of the at least one compound of formulas (I), (II) or mixtures thereof, more particularly, between about 10 wt. % and about 25 wt. % of the at least one compound of formulas (I), (II) or mixtures thereof, and especially between about 10 wt. % and about 20 wt. % the remainder gding solvent. In use, the compositions of this invention are added in concentrations between about 0.25 ppm and about 500 ppm of the at least one compound of formulas (I), (II) or mixtures thereof, preferably, between about 0.5 ppm and 100 ppm of the at least one compound of formulas (I), (II) or mixtures thereof, particularly, between about 0.5 ppm and 50 ppm of the at least one compound of formulas (I), (II) or mixtures thereof, more particularly, between about 0.5 ppm and 25 ppm of the at least one compound of formulas (I), (II) or mixtures thereof, and especially between about 0.5 ppm and about 10 ppm to the fluid being treated. Alternatively, the compositions of this invention are used as a ratio based on the amount of noxious sulfur species present in the fluid to be treated. Generally, the compositions is added to the fluid so that about 0.5 to about 10 ppm, preferably, about 2 ppm to 4 ppm, of the composition is present per ppm of hydrogen sulfide or other noxious sulfur species in the fluid to be treated. The compositions of this invention allow for more complete removal of hydrogen sulfide at a minimal cost, often without the need for a scrubber tower, which further reduces related equipment costs. The present compositions are active in two (two liquid phases or a gas phase and a liquid phase) and three phase applications (two liquid phase and one gas phase).

The present invention broadly relates to a method for making an oil-soluble sulfur scavenging compounds of formulas (I), (II) or mixtures thereof including the steps of adding a molar excess of an aldehyde to a solution of at least one sterically hindered amine under conditions adjusted to maximize the formation of compounds of formulas (I), (II) or mixtures thereof and digesting the resulting reaction mixture under condition to convert all unreacted aldehyde into innocuous by-products which can be readily separated from the desired amine product via distillation. Generally, the molar excess is greater than about 1.25 to 1, aldehyde to amine, preferably, 1.5 to 1, particularly, 1.75 to one and more particularly, greater than 1.75 to 1. The molar excess can also be defined as a ratio of total aldehyde or aldehyde donor to total reactive amine, where the ratio in is a range from >1:1 to about 5:1, preferably, from about 1.25:1 to about 5:1, particularly, from about 1.5:1 to about 4:1, more particularly, from about 1.75:1 to about 3:1. The method can also include the step of decanting a top oil soluble layer from a bottom aqueous layer and/or distilling the reaction product to produce a substantially pure compound(s) of formulas (I), (II) or mixtures thereof.

The present invention broadly relates to a method for treating a fluid containing noxious sulfur-containing species including the steps of contacting a fluid with an effective amount of a scavenger including at least one compound of formulas (I), (IA), (IB), (II), (IIA), (IIB) or mixtures thereof, where the amount is sufficient to reduce, reduce below a given level, or substantially eliminate noxious sulfur-containing species in the fluid and where the fluid comprises an aqueous phase, an organic phase (oil phase), a gas phase or mixture thereof, and preferably, includes at least an organic phase.

Alternatively, the method includes the step of adding singly, periodically, intermittently or continuously an effective amount of an oil-soluble sulfur scavenging composition including at least one compound of formulas (I), (II) or mixtures thereof to the fluid, where the amount is sufficient to reduce, reduce below a given level or substantially eliminate all noxious sulfur-containing species. Preferably, the amount is adjusted within a range of about 1 to about 10 ppm of scavenging composition per ppm of noxiou sulfur-containing species present in the fluid. Thus, the method can include the steps of monitoring a concentration of noxious sulfur-containing species in the fluid on a single, periodic, intermittent or continuous basis and adjusting the amount of compositions added to the fluid so that the amount is within the range. Additionally, the method can include the steps of monitoring a concentration of noxious sulfur-containing species in the fluid on a single, periodic, intermittent or continuous basis and adjusting the amount of compositions added to the fluid until the monitored concentration of noxious sulfur species is below a desired level.

Suitable sterically hindered amines include, without limitation: (1) disubstituted or secondary amines where one of the substituents has at least three carbon atoms; (2) primary amines having a sterically bulky group including, without limitation, di-substituted methyl groups, tri-substituted methyl groups, aralkyl groups, aryl groups, alkaryl groups, other bulky groups or mixtures or combinations thereof, (3) diamines having a sterically bulky group including, without limitation, di-substituted methyl groups, tri-substituted methyl groups, aralkyl groups, aryl groups, alkaryl groups, other bulky groups or mixtures or combinations thereof, or (4) mixtures or combinations thereof. All the substituents in the above articulated amines can have one or more of the carbon atoms replaced by oxygen atoms in the form of ether moieties and/or nitrogen-containing groups in the form of tertiary amine or amide moieties and/or one or more of the hydrogen atoms replaced by fluorine atoms and/or chlorine atoms. The amine can be selected from the group consisting of dialkylamines mixed dialkylamines, aryl amines, alkylaryl amines, diaryl amines, dialkarylamines, diaralkylamines, dicycloalkylamines, mixed cycloalkylamines, alkycycloalkylamines, arylcycloalkylamines, bis(dimethylamino-alkyl) amines, bis(aminoalkyl or aminocycloalkyl)methanes, bis(aminoaryl)methanes, ring system including an external primary or an internal or external secondary amine, and mixtures or combinations thereof. Exemplary examples of sterically hindered amines include, without limitation, dipropylamine, diisopropylamine, dibutylamine, diisobutylamine, di-tertbuylamine, dipentylamine, diisopentylamine, dineopentylamine, dihexylamines, diheptylamine, dioctylamines, dinonylamine, didecylamine, diadamanylamine, butyl-propylamines, butyl-hexylamines, butyl-heptylamines, hexyl-heptylamines, aniline, substituted analogs thereof, naphthyl amine, substituted analogs thereof, diphenyl amine, dinaphthylamine, substituted analogs thereof, bis(monomethyphenyl)amine, bis(dimethylphenyl)amine, bis(trimethylphenyl)amine, dicyclopentylamine, dicyclohexylamine, dicyclooctylamine, N-cyclopentyl,N-cyclohexylamine, tetramethylamino bis-propylamine ($(((CH_3)_2NCH_2CH_2CH_2)_2NH)$), bis(4-aminocyclohexyl)methane, bis(4-aminophenyl)methane, 1,8-diazabicyclo[5.4.0]undec-7-ene and bispicoylamine and mixture or combinations thereof.

Suitable aldehydes useful for making the subject compositions of this invention include, without limitation, aldehydes having the formula R—CHO, such as formaldehyde and formaldehyde donors, alkylaldehydes having between about 1 and about 20 carbon atoms, preferably, between about 1 and about 10 carbon atoms, arylaldehydes, methoxyaldehydes, hydroxyaldehydes, aldols such as cinnaminaldehyde, glyceraldehydes, vanillin, veratraldehyde, alloxan, noneal, 1-formyl piperidine, salicylaldehyde, citronella or the like, aldehyde donors or mixtures or combinations thereof. Exemplary examples of aldehydes useful in this invention, include, without limitation, monoaldehydes having from 1 to 10 carbon atoms (one or more carbon atoms can be a non-carbon atoms including oxygen or nitrogen and can include fluorine and/or chlorine hydrogen substitutions) such as formaldehyde (inhibited or non-inhibited, paraformylaldehyde, methyl formal, acetaldehyde, paraldehyde (trimer of acetaldehyde), glycolaldehyde, glyceraldehyde, hydroxymethyl glyceraldehyde, butyl formal, trioxane, tetroxane, glyoxal, and methyl formcel (a hemi-acetal, 55 percent formaldehyde solution in methanol and methoxy-methanol or water), aldols, or the like or mixture or combinations thereof.

Aldehyde donors believed useful in making the compositions of the invention are preferably selected from the group consisting of hydantoin; hexamethylenetetramine; hexamethylolmelamine; 2-[(hydroxymethyl)amino]ethanol; 5,5-dimethylhydantoin; tris(hydroxymethyl)nitromethane; 2-nitro-2-methyl-1-propanol; 2-nitro-2-ethyl-1,3-propanediol; 2-nitro-1-butanol; and acetaldehyde ammonia.

Solvents can also be useful in the preparation of the amines of formula (I) and can be any solvent in which the final product is soluble, but not water, such solvents include any aprotic solvent such as hydrocarbon solvent such as toluene, xylene, alkylnaphthalenes, terpenes, or nonaqueous solvents that have a boiling point above that of the amine starting reagent. The composition can also include mixed solvent systems where the second solvent is a cellosolve.

Solvents suitable for use in treating fluids of this invention include, without limitation, alcohol solvents, alkane solvents having between about 5 and about 20 carbon atoms, alkene solvents having between about 5 and about 20 carbon atoms, aromatics having between about 6 and about 15 carbon atoms, glycol ether solvents (e.g., CELLOSOLVE™ solvents and CARBITOL™ solvents from DOW Chemical Company, Midland, Mich.), ether solvents having between about 6 and about 20 carbon atoms, chlorinated solvents, ketone solvents or mixtures or combinations thereof. Preferred solvents are aprotic solvent include, without limitation, alkanes having between about 5 and about 20 carbon atoms, aromatic solvents having between about 6 and about 15 carbon atoms, cellosolves, alcohol-alkenyloxide oligomers, ethers having between about 6 and about 20 carbon atoms, or mixtures or combinations thereof.

The use of catalysts in the compositions of the invention can be desirable for extending their useful conversion life, for improving the conversion of organic sulfides to a less noxious form, and for converting low molecular weight sulfide reaction products to higher oxidative forms. In most cases the use of up to about 5 weight percent catalyst in the reactive mixtures by which the subject compositions are produced is believed to be satisfactory for achieving the purposes described above.

Catalysts believed to be satisfactory for use in making the compositions of the invention include, for example, potassium or sodium borohydride in aqueous alkaline solution; catechol borane; ammonia; thiourea; aluminum chlorohydrate; aluminum hydroxide; urea; iron hydroxide; iron chelates; tris(hydroxymethyl)nitromethane; brass or copper; acetylacetonate chelate of titanium; sodium percarbonate; erythorbic acid; lactone; serine; sodium methylate; and the sodium salt of lauryl sarcosinate. Particularly preferred catalysts for use in the subject compositions are amine chelated brass, tris(hydroxymethyl)nitromethane, catechol borane, and sodium salt of lauryl sarcosinate.

EXPERIMENTAL SECTION

Example 1

This example illustrates the preparation of a preferred sulfur scavenging composition of this invention derived from the alkylation of dibutylamine.

To a 4000 mL filter flask was charged 1430.05 grams of di-n-butyl amine. The amine was heated 90° F. and 1570.01 grams of a 37 wt % aqueous solution of formaldehyde was added drop wise to the flask with stirring at a rate of about 3 drops per second. Aldehyde addition was complete after about 4.5 hours. The reaction was brought to reflux and refluxed under pressure for about 8-12 hours at a temperature between about 165° F. and about 170°. The resulting reaction product was separated by decantation and the organic layer was distilled; however, the organic layer can be used as is as well. 1559.3 grams of product was distilled from reaction mixture representing a 51.98% of the reaction mixture; water represented 1172.7 grams or 39.09% of the reaction mixture; distillation residue represented 56.59 grams or 1.89% of the reaction mixture; and 209.02 grams or 6.97% of the reaction mixture represented vapor loss. The product had a pH of 9.15, an AEW of 149 and a specific gravity of 0.783 g/mL. The product had a pH of 10.5 as a 5% solution of 3:1 isopropanol to water. The mole ratio of aldehyde to amine was 1.75.

Example 2

This example illustrates the preparation of a preferred sulfur scavenging composition of this invention derived from the alkylation of dibutylamine.

To a filter flask was charged 305.02 grams of di-n-butyl amine. The amine was heated 90° F. and 334.85 grams of a 37 wt % aqueous solution of formaldehyde was added drop wise to the flask with stirring at a rate of about 3 drops per second. After aldehyde addition, reaction was brought to reflux and heated to a temperature of about 190° F. under pressure and stirred at temperature for about 8-12 hours. The resulting reaction product was distilled to yield 375 grams of product. GC-MS analysis showed the product to be substantially pure di-butyl methyl amine ($CH_3N(n$-$butyl)_2$). The mole ratio of aldehyde to amine was 1.75. The product had a yellow amber color.

Example 3

This example illustrates the preparation of a preferred sulfur scavenging composition of this invention derived from the alkylation of dibutylamine.

To a filter flask was charged 305.02 grams of di-n-butyl amine. The amine was heated 90° F. and 334.83 grams of a 37 wt % aqueous solution of formaldehyde was added drop wise to the flask with stirring at a rate of about 3 drops per second. After aldehyde addition, reaction was brought to reflux and heated to a temperature of about 185° F. under pressure and stirred at temperature for about 8-12 hours. The resulting reaction product was distilled to yield 409.31 grams of product. GC-MS analysis showed the product to be substantially pure di-butyl methyl amine ($CH_3N(n$-$butyl)_2$). The mole ratio of aldehyde to amine was 1.75. The product was colorless.

Example 4

This example illustrates the preparation of a preferred sulfur scavenging composition of this invention derived from the alkylation of dibutylamine.

To a filter flask was charged 305.06 grams of di-n-butyl amine. The amine was heated 90° F. and 334.84 grams of a 37 wt % aqueous solution of formaldehyde was added drop wise to the flask with stirring at a rate of about 3 drops per second. After aldehyde addition, reaction was brought to reflux and heated to a temperature of about 165° F. under pressure and stirred at temperature for about 8-12 hours. The resulting reaction product was distilled to yield 330.39 grams of product. GC-MS analysis showed the product to be substantially pure di-butyl methyl amine ($CH_3N(n$-$butyl)_2$). The mole ratio of aldehyde to amine was 1.75. The product was colorless.

Example 5

This example illustrates the preparation of a preferred sulfur scavenging composition of this invention derived from the alkylation of dibutylamine using a large excess of aldehyde.

To a filter flask was charged 305.06 grams of di-n-butyl amine. The amine was heated 90° F. and 334.84 grams of a 37 wt % aqueous solution of formaldehyde was added drop wise to the flask with stirring at a rate of about 3 drops per second. After aldehyde addition, reaction was brought to reflux and heated to a temperature of about 165° F. under pressure and stirred at temperature for about 8-12 hours. The resulting reaction product was distilled to yield 330.39 grams of product. GC-MS analysis showed the product to be substantially pure di-butyl methyl amine ($CH_3N(n$-$butyl)_2$). The mole ratio of aldehyde to amine was 3. The product was colorless.

Scavenger Testing

Introduction

In this set of experiments various hydrogen sulfide ($H_2S$) scavenging chemicals were screened testing for $H_2S$ uptake capacity within two experimental regimes. In Part 2, measurements of the relative efficacy of a various sulfur scavengers were determined in an oil-based drilling mud system under sour gas pressure. These tests were carried out in a stirred autoclave system, which permitted effective agitation of both fluid phases (mud and sour gas) as well as any aqueous phase present and the controlled injection of the scavenger. Two experiments were conducted, a preliminary test without any scavenger addition (to evaluate the $H_2S$ "dissolution" capacity of the mud itself), and an initial scavenger test using a composition of this invention comprising methyl, dibutyl amine, scavenger #1. Preliminary results are reported herein. In Part 1, bench top capacity testing of various sulfur scavengers using a flow-through bubble tower type apparatus were performed and reported separately. A schematic of the apparatus used for these tests is shown in FIG. 1.

Results

Trial 1

After adequate homogenization of the drilling fluid and solids (barite), approximately 100 g of the mud was poured into a 300 mL stirred autoclave. The system was then sealed and heated to 60° C. The headspace was then flushed with helium (35 psig) three times. Prior to administering the sour gas into the autoclave chamber, the injection throughways were purged three times with a sour gas mixture containing about 21% $H_2S$ with the balance being methane.

The 21% $H_2S$ mixture was then injected into the vessel to 350 psig and stirred for 2 minutes. A 250 psig pressure drop was observed (after stirring). Additional 21% $H_2S$ mixture was introduced into the vessel until a relatively constant pressure (approx. 320 psig) was observed after 2 minutes of continuous stirring following each additional injection of the 21% $H_2S$ mixture. The headspace gas was sampled and its composition determined by gas chromatography analysis. It was found to be nearly 100% methane with no detectable $H_2S$. The vessel headspace was, therefore, depleted and the test gas re-injected. The depletion and re-injection steps were repeated until the headspace composition contained >15% $H_2S$. After each injection, the headspace gas composition was determined. Table I summarizes the conditions of each injection.

TABLE 1

Drilling Mud Saturation

| Injection # | Initial Pressure (psig) | Final Pressure (psig) | % $H_2S$ (mol %) | Mass $H_2S$ (gms) |
|---|---|---|---|---|
| 1 | 350 | 250 | 0 | 1.34 |
| 2 | 440 | 345 | 6.17 | 1.13 |
| 3 | 440 | 365 | 13.33 | 0.58 |
| 4 | 440 | 380 | 16.33 | 0.35 |

The data in Table 1 indicates that up to 3.40 g of $H_2S$ was dissolved in the mud. An additional 1.34 g of $H_2S$ was calculated to be contained in the headspace based on the 21% $H_2S$ mixture used. Therefore, a total of 4.74 g $H_2S$ was added to the reactor. Based on a 10:1 ratio of scavenger to $H_2S$ (by mass), it was determined that at least 47.4 g of scavenger would be required for injection to neutralize the $H_2S$ in the reactor.

No scavenger was injected in this trial. The drilling mud was decanted from the vessel and appeared considerably darker in color. The recovered liquid phase was centrifuged and the separated solids were recovered.

Trial 2

The second trial was design to test a new method of saturating the drilling mud and also to examine the rate at which $H_2S$ is taken up (to see if less mud is required). As in Trial 1, 100 g of drilling mud was added to the autoclave, the system was heated to 60° C., and the headspace was flushed with helium. To saturate the mud, pure $H_2S$ was injected several times into the autoclave at a pressure of 80 psig. The pressure drop was monitored and any remaining pressure in the headspace was depleted prior to another injection of pure $H_2S$. This procedure continued until a pressure drop of less than 5 psig was observed. At that point, the remaining $H_2S$ in the headspace was removed. A total of 4.3 g of $H_2S$ had been added to the autoclave. The through ways were then flushed with the test gas mixture, 21% $H_2S$ in methane, and the vessel charged with the gas. The final mass of $H_2S$ in the vessel was 5.6 g. The headspace composition was determined to be 18.80% $H_2S$.

The 100 mL stainless steel scavenger injection vessel was then charged with 55.9 g of a scavenger of Example 1 and re-weighed. The liquid was then over-pressured with helium (1600 psig). The vessel was then inverted and connected to the appropriate autoclave port. Scavenger #1 was then injected into the vessel while the mud was being stirred, and the pressure in the autoclave was observed to increase to 410 psig (the calculated pressure increase was 490 psig). The scavenger injection vessel was reweighed and the amount of scavenger actually charged to the autoclave was determined to be 55.3 g. An aliquot of the headspace gas was obtained and analyzed at 30 minutes and 6 hours. Results showed $H_2S$ concentrations of 3.84% and 0%, respectively.

Trial 3

As a result of the rapid consumption of $H_2S$ by the scavenger of Example 1 in Trial 2, the scavenger of Example 1 was run at $H_2S$ to scavenger ratios of about 10:1 and about 5:1 sampling every 30 minutes or 15 minutes to ascertain effectiveness. Several triazine scavengers were also run for comparison purposes. Triazine 1 was prepared from dimethylaminopropylamine as is an oil soluble product. Triazine 2 was prepared from dimethylamino propylamine with excess formaldehyde and is also an oil soluble product. Triazine 3 was prepared from reaction product of $MEA/CH_2O$ and is an water soluble product.

Figure 6:
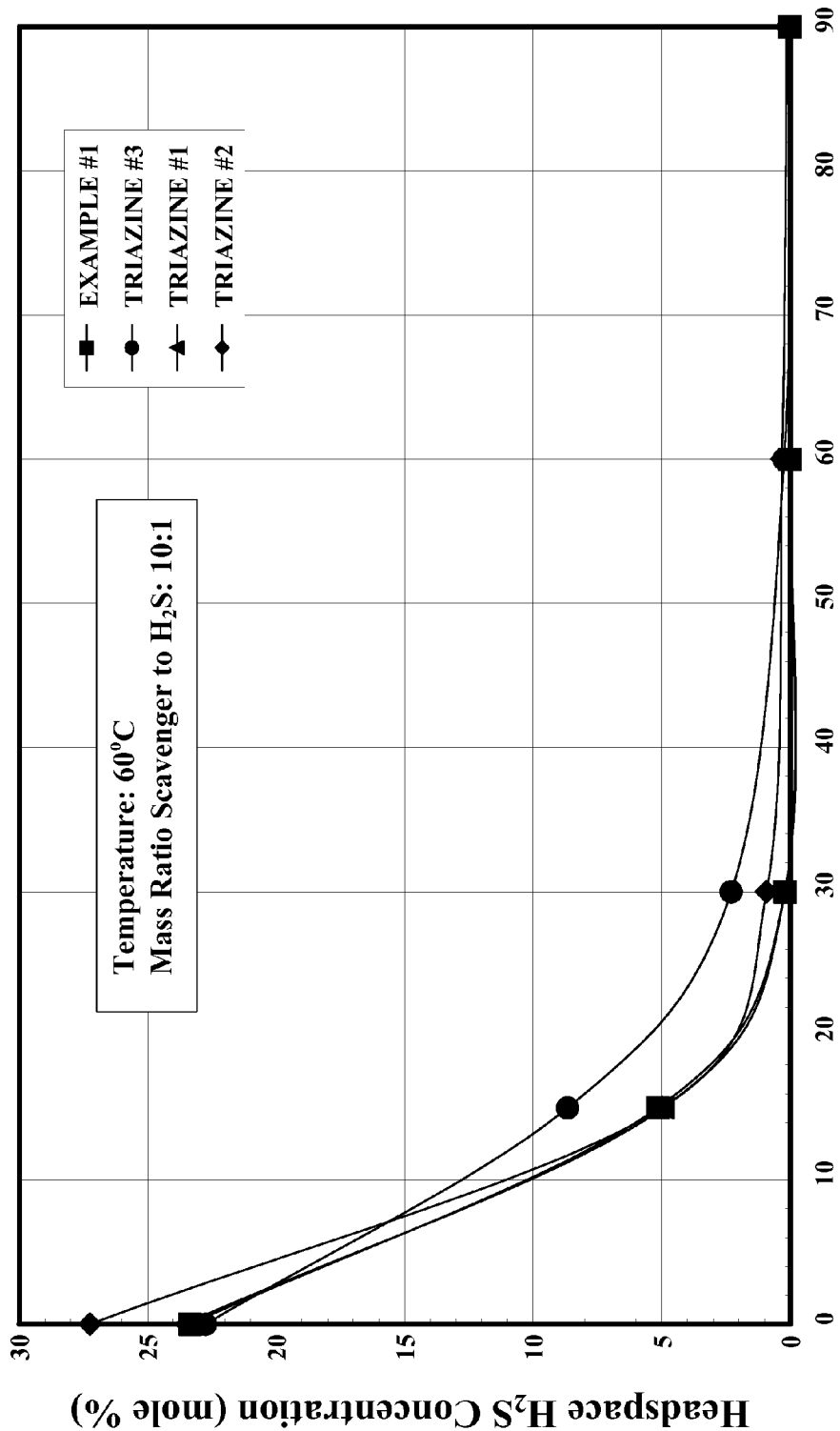
FIG. 6 depicts a composite plot of headspace $H_2S$ concentration verses time for the scavengers of FIGS. 2-5 at about a 10:1 scavenger to $H_2S$ ratio.

Referring now the FIGS. 2-5, the scavenger of Example 1 was run against the three triazine scavengers: Triazine 1-3. Referring now to FIG. 6, the headspace $H_2S$ data is compared for all four scavengers. As is clear from the data, the scavenger of Example 1 compares favorably with the oil soluble triazine scavengers: Triazines 1 and 2, while the water soluble triazine scavenger was some what less effective. Thus, the monomeric materials of this invention are equally effective in reducing and/or eliminating $H_2S$ in an oil or organic phase material.

Figure 7:
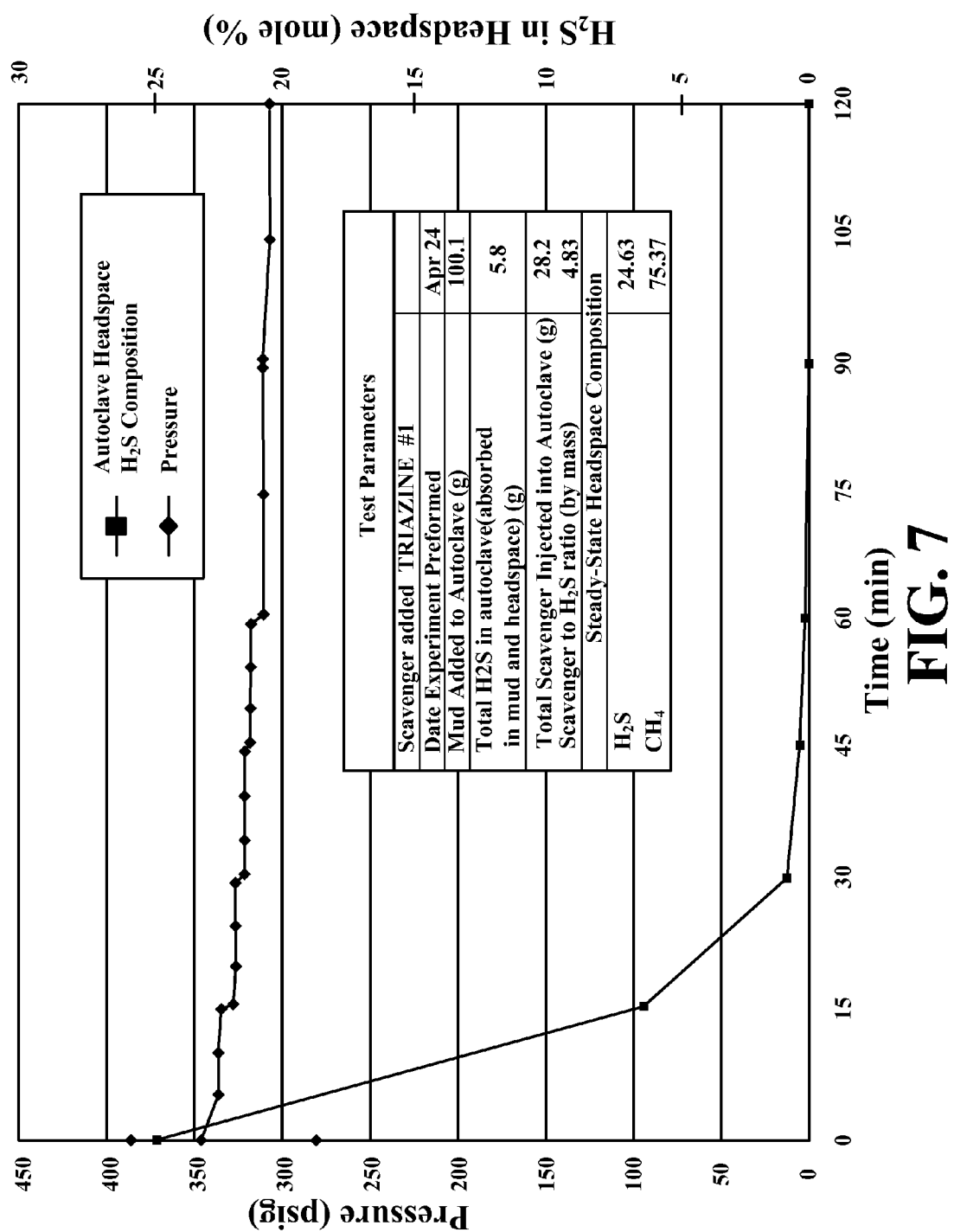
FIG. 7 depicts a plot of pressure and $H_2S$ concentration verses time for a comparative Triazine 1 scavenger tested at high pressure in a sour gas-drilling mud system pressure and headspace $H_2S$ composition profiles at about a 5:1 scavenger to $H_2S$ ratio.
Figure 8:
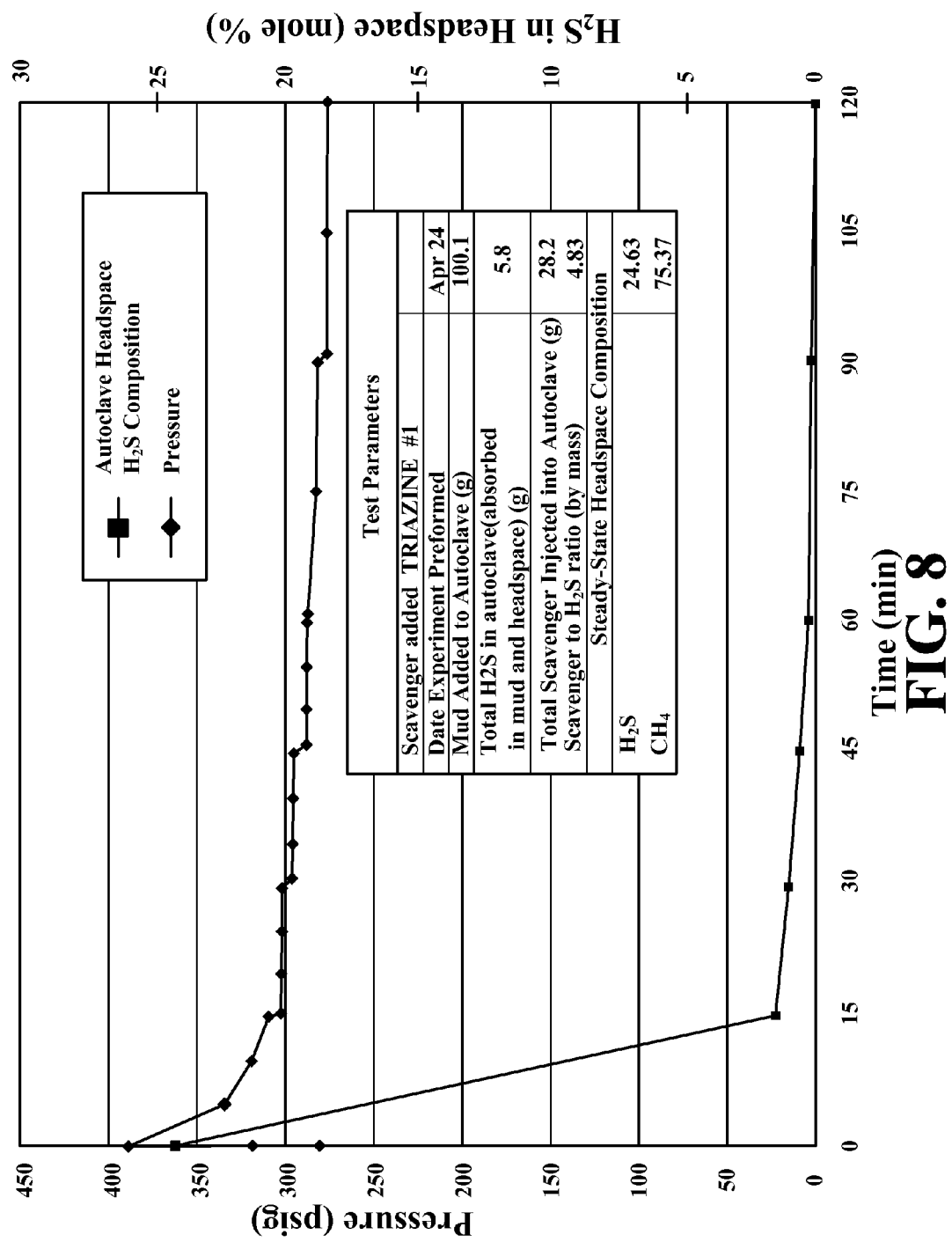
FIG. 8 depicts a plot of pressure and $H_2S$ concentration verses time for a scavenger of this invention tested at high pressure in a sour gas-drilling mud system pressure and headspace $H_2S$ composition profiles at about a 5:1 scavenger to $H_2S$ ratio.
Figure 9:
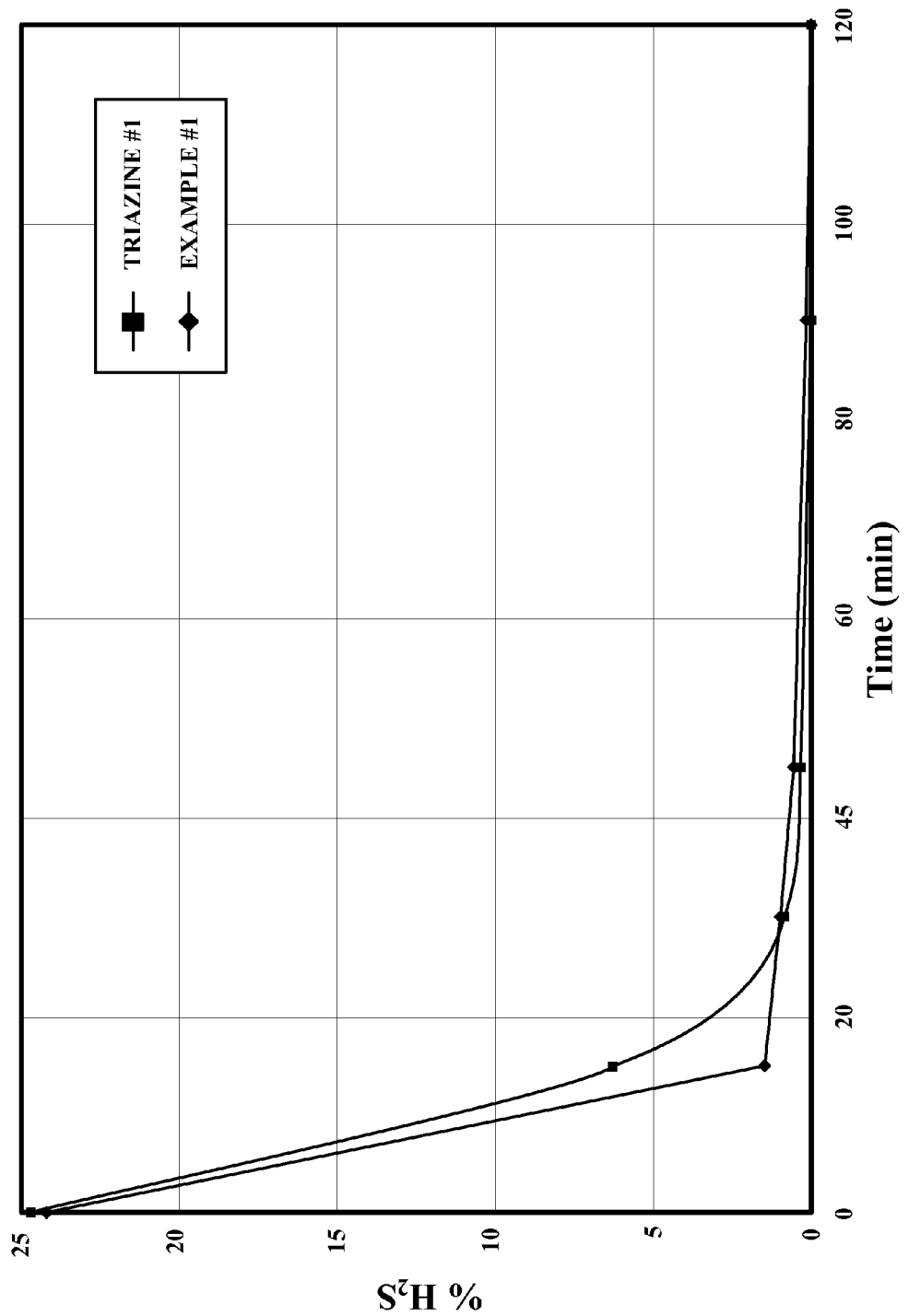
FIG. 9 depicts a composite plot of headspace $H_2S$ concentration verses time for the scavengers of FIGS. 7-8 at about a 5:1 scavenger to $H_2S$ ratio.

Referring now the FIGS. 7-8, the scavenger of Example 1 was run against the Triazine 1 scavenger at about a 5:1 scavenger to $H_2S$ ratio, while FIG. 9 shows the headspace $H_2S$ data for the two scavengers at the 5:1 ratio. It is clear from the data of FIG. 9 that the scavenger of Example 1 reduced the $H_2S$ level significantly faster than the Triazine 1 scavenger. The scavenger of Example 1 reduced the $H_2S$ level by about 93% within 15 minutes, while the Triazine 1 scavenger reduced the $H_2S$ level by only about 74% within 15 minutes, a difference of about 10%. Both behaved substantially similar in the 30 to 120 minute time frame. Thus, the scavengers of this invention remove $H_2S$ more rapidly than similar Triazine scavenger. Preferred scavengers of this invention have initial $H_2S$ reduction rates (within the first 15 minutes after addition) that are 5% to 10% or more than conventional triazine scavenger.

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

I claim:

1. A method for making a sulfur scavenger comprising the steps of:
adding a molar excess of at least one aldehyde or aldehyde donor to at least one secondary amine or a primary amine including at least one sterically bulky substituent at a temperature and for a time sufficient to form an oil-soluble sulfur scavenger, where the scavenger comprises substantially monomeric aldehyde-amine adducts derived from the reaction of a single aldehyde and a single amine so that the resulting adducts comprise amines bonded to three different groups where two of the groups can be a part of a ring structure and characterized by compounds of formulas (I), (II) or mixtures thereof:

$$CH_2R\text{---}NR^1R^2 \tag{I}$$

$$CH_2R\text{---}(R^4)NR^3N(R^5)\text{---}CH_2R \tag{II}$$

where R is a hydrogen atom (H) or a carbon-containing group, $R^1$ and $R^2$ are different, at least one being a sterically hindered carbon-containing group having between 3 and about 24 carbon atoms or $R^1$ and $R^2$ can form a ring system, $R^3$ is a divalent sterically hindered carbon-containing group, $R^4$ and $R^5$ are different and are H or sterically hindered carbon-containing group having between 3 and about 24 carbon atoms, provided that both $R^4$ and $R^5$ are not H and where one or more hydrogen atoms of R, $R^1$, $R^2$, $R^3$, $R^4$, $R^5$ or mixtures thereof can be replaced by fluorine atoms, chlorine atoms or mixtures thereof,
where the $CH_2R$ groups are derived from the at least one aldehyde of the formula R—CHO, where the temperature is from about 140° F. (60° C.) to about 200° F. (93.3° C.), and where the compounds are adapted to reduce, reduce below a target level or substantially eliminate noxious sulfur-containing species in a fluid.

2. The method of claim 1, further comprising the step of: maintaining the adducts at a temperature sufficient to convert excess aldehyde or aldehyde donor into innocuous compounds.

3. The method of claim 1, further comprising the step of: distilling the adduct to form a purified adduct.

4. The method of claim 1, further comprising the steps of: decanting an organic phase from an aqueous phase, and distilling the adduct to form a purified adduct.

5. The method of claim 1, wherein the amine is selected from the group consisting of: (1) a disubstituted or secondary amine where one of the substituents has at least three carbon atoms; (2) a primary amine having a sterically bulky group including di-substituted methyl groups, tri-substituted methyl groups, aralkyl groups, aryl groups, alkaryl groups, other bulky groups or mixtures or combinations thereof; (3) a diamine having a sterically bulky group including di-substituted methyl groups, tri-substituted methyl groups, aralkyl groups, aryl groups, alkaryl groups, other bulky groups or mixtures or combinations thereof; and (4) a mixture or combination thereof, where the substituents can have one or more of the carbon atoms replaced by oxygen atoms in the form of ether moieties and/or nitrogen-containing groups in the form of tertiary amine or amide moieties and/or one or more of the hydrogen atoms replaced by fluorine atoms and/or chlorine atoms.

6. The method of claim 1, wherein the amine is selected from the group consisting of a dialkylamine, a mixture of dialkylamines, an aryl amine, an alkylaryl amine, a diaryl amine, a dialkarylamine, a diaralkylamine, a dicycloalkylamine, a mixture of cycloalkylamine, an alkycycloalkylamine, an arylcycloalkylamine, a bis(dimethylamino-alkyl) amine, a bis(aminoalkyl or bis(aminoaryl)methane, a ring system including an external primary or an internal or external secondary amine, and a mixture or combination thereof.

7. The method of claim 6, wherein the amine is selected from the group consisting of dipropylamine, diisopropylamine, dibutylamine, diisobutylamine, di-tertbuylamine, dipentylamine, diisopentylamine, dineopentylamine, dihexylamine, diheptylamine, dioctylamine, dinonylamine, didecylamine, diadamanylamine, butyl-propylamine, butyl-hexylamine, butyl-heptylamine, hexyl-heptylamine, aniline, substituted analogs thereof, naphthyl amine, substituted analogs thereof, diphenyl amine, dinaphthylamine, substituted analogs thereof, bis(monomethyphenyl)amine, bis(dimethylphenyl)amine, bis(trimethylphenyl)amine, dicyclopentylamine, dicyclohexylamine, dicyclooctylamine, N-cyclopentyl,N-cyclohexylamine, tetramethylamino bis-propylamine $(((CH_3)_2NCH_2CH_2CH_2)_2NH)$, bis(4-aminocyclohexyl) methane, bis(4-aminophenyl)methane, 1,8-diazabicyclo[5.4.0]undec-7-ene and bispicoylamine and mixture or combinations thereof.

8. The method of claim 1, wherein R is H or a carbon-containing group having between 1 and about 10 carbon atoms.

9. The method of claim 1, wherein the aldehyde is selected from the group consisting of formaldehyde or a formaldehyde donor, an alklyaldehyde or an alklyaldehyde donor, an arylaldehyde or an arylaldehyde donor, a methoxyaldehyde or a methoxyaldehyde donor, an hydroxyaldehyde or an hydroxyaldehyde donor, an aldol condensate and mixture of combinations thereof.

10. The method of claim 1, wherein the aldehyde is selected from the group consisting of formaldehyde, acetaldehyde, cinnaminaldehyde, glyceraldehydes, vanillin, veratraldehyde, alloxan, noneal, 1-formyl piperidine, salicylaldehyde, citronella, and mixtures or combinations thereof.

11. The method of claim 1, wherein the aldehyde is from an aldehyde donor selected from the group consisting of inhibited or non-inhibited paraformylaldehyde, methyl formal, acetaldehyde, paraldehyde (trimer of acetaldehyde), glycolaldehyde, glyceraldehyde, hydroxymethyl glyceraldehyde, butyl formal, trioxane, tetroxane, glyoxal, methyl formcel (a hemi-acetal, 55 percent formaldehyde solution in methanol and methoxy-methanol or water), hydantoin, hexamethylenetetramine, hexamethylolmelamine, 2-[(hydroxymethyl)amino]ethanol, 5,5-dimethylhydantoin, tris(hydroxymethyl) nitromethane, 2-nitro-2-methyl-1-propanol, 2-nitro-2-ethyl-1,3-propanediol, 2-nitro-1-butanol, and acetaldehyde ammonia and mixtures or combinations thereof.

12. A sulfur scavenging composition comprising a reaction product of at least one sterically hindered primary or secondary amine and a molar excess of at least one aldehyde of the formula R—CHO or aldehyde donor, where the aldehyde is added to the amine under conditions to produce adducts comprising substantially monomeric aldehyde-amine adducts so that the adducts are substantially compounds derived from the reaction of a single aldehyde and a single amine so that the resulting adducts comprise amines bonded to three different groups where two of the groups can be a part of a ring structure and characterized by compounds of formula (I), (II) or mixtures thereof:

$$CH_2R\text{---}NR^1R^2 \quad (I)$$

$$CH_2R\text{---}(R^4)NR^3N(R^5)\text{---}CH_2R \quad (II)$$

where R is a hydrogen atom (H) or a carbon-containing group, $R^1$ and $R^2$ are different, at least one being a sterically hindered carbon-containing group having between 3 and about 24 carbon atoms or $R^1$ and $R^2$ can form a ring system, $R^3$ is a divalent sterically hindered carbon-containing group, $R^4$ and $R^5$ are different and are H or sterically hindered carbon-containing group having between 3 and about 24 carbon atoms, provided that both $R^4$ and $R^5$ are not H and where one or more hydrogen atoms of R, $R^1$, $R^2$, $R^3$, $R^4$, $R^5$ or mixtures thereof can be replaced by fluorine atoms, chlorine atoms or mixtures thereof, where the $CH_2R$ groups are derived from the aldehyde, where the reaction product is formed at a temperature is from about 140° F. to about 200° F., where the composition is oil soluble, and where the adducts are adapted to reduce, reduce below a target level or substantially eliminate noxious sulfur-containing species in a fluid.

13. The composition of claim 12, wherein $R^1$ and $R^2$ are different sterically hindered carbon-containing groups.

14. The composition of claim 12, wherein R is H.

15. The composition of claim 12, wherein R is selected from the group an alkyl group, an aryl group, an alkaryl group, an aralkyl group and mixtures or combinations thereof.

16. The composition of claim 12, wherein R is H and $R^1$ and $R^2$ are different and are selected from the group consisting of diisobutylamine, dipentylamine, diisopentylamine, dineopentyl amine, diadamanylamine, diphenyl amine, dicyclopentylamine, dicyclohexylamine, tetramethylamino bis-propylamine $(((CH_3)_2NCH_2CH_2CH_2)_2NH)$, bis(4-aminocyclohexyl)methane, bis(4-aminophenyl)methane, 1,8-diazabicyclo[5.4.0]undec-7-ene, bispicoylamine and mixtures or combinations thereof.

17. The composition of claim 12, wherein the composition comprises a solution including from about 5 wt. % to about 50 wt. % of the adducts the remainder being an organic solvent.

18. The composition of claim 13, wherein the composition comprises a solution including from about 5 wt. % to about 50 wt. % of the adducts the remainder being an organic solvent.

19. The composition of claim 12, wherein the adducts is a compound of formulas (IA), (IIA) or mixtures or combinations thereof:

$$CH_2R\text{---}NR^{1'}R^{2'} \quad (IA)$$

$$CH_2R\text{---}(R^{4'})NR^3N(R^{5'})\text{---}CH_2R \quad (IIA)$$

where R is H or a carbon-containing group, $R^{1'}$ and $R^{2'}$ are different sterically hindered carbon-containing groups having between about 3 and about 24 carbon atoms or $R^1$ and $R^2$ can form a ring system, $R^3$ is a previously defined, $R^{4'}$ and $R^{5'}$ are sterically hindered carbon-containing group having between 3 and about 24 carbon atoms, and where one or more hydrogen atoms of R, $R^{1'}$, $R^{2'}$, $R^3$, $R^{4'}$, $R^{5'}$ or mixtures thereof can be replaced by fluorine atoms, chlorine atoms or mixtures thereof.

20. The composition of claim 19, wherein the composition comprises a solution including from about 5 wt. % to about 50 wt. % of the adducts the remainder being an organic solvent.

21. The composition of claim 12, wherein the adducts is a compound of formulas (IB), (IIB) or mixtures or combinations thereof:

$$CH_2R\text{---}NR^{1''}R^{2''} \quad (IB)$$

$$CH_2R\text{---}(R^{4''})NR^3N(R^{5''})\text{---}CH_2R \quad (IIB)$$

where R is H or a carbon-containing group, $R^{1''}$ is a sterically hindered carbon-containing group having between about 3 and about 24 carbon atoms, $R^{2''}$ is H or sterically hindered carbon-containing group having between 3 and about 24 carbon atoms, $R^3$ is as previously defined, $R^{4''}$ and $R^{5''}$ are H and where one or more hydrogen atoms of R, $R^{1''}$, $R^{2''}$, $R^3$ or mixtures thereof can be replaced by fluorine atoms, chlorine atoms or mixtures thereof, and where the amount is sufficient to reduce, reduce below a given value, reduce below detection limits or substantially eliminate noxious sulfur species from the fluid and where the fluid includes an organic phase.

22. The composition of claim 21, wherein the composition comprises a solution including from about 5 wt. % to about 50 wt. % of the adducts the remainder being an organic solvent.

* * * * *